(12) United States Patent
Black (10) Patent No.: US 7,561,786 B1
(45) Date of Patent: Jul. 14, 2009

(54) METHODS AND SYSTEMS FOR AUTOMATIC IDENTIFICATION OF DEVICE ACCESSORIES, AND DEVICES CONFIGURED TO AUTOMATICALLY IDENTIFY ATTACHED ACCESSORIES

(75) Inventor: Gary W. Black, Cary, NC (US)

(73) Assignee: Qurio Holdings, Inc, Raleigh, NC (US)

( * ) Notice: Subject to any disclaimer, the term of this patent is extended or adjusted under 35 U.S.C. 154(b) by 481 days.

(21) Appl. No.: 11/298,739

(22) Filed: Dec. 9, 2005

(51) Int. Cl.
*G03B 17/00* (2006.01)

(52) U.S. Cl. .......... 396/57; 396/310; 396/422; 396/439; 396/544; 640/3.51; 640/10.1; 640/10.42

(58) Field of Classification Search ............ 396/57, 396/422, 439, 49, 310, 532, 544; 340/3.51, 340/10.1, 10.42
See application file for complete search history.

(56) References Cited

U.S. PATENT DOCUMENTS

| 4,540,262 A * | 9/1985 | Nakai et al. ............ 396/147 |
| 5,113,210 A * | 5/1992 | Kashiyama et al. ....... 396/86 |
| 6,693,512 B1 * | 2/2004 | Frecska et al. ........... 340/10.1 |
| 2001/0035812 A1 * | 11/2001 | Goetz ................... 340/5.61 |
| 2004/0075541 A1 * | 4/2004 | Simoneau ............ 340/426.11 |
| 2005/0096084 A1 * | 5/2005 | Pohja et al. ............. 455/556.1 |
| 2005/0249486 A1 * | 11/2005 | Murray .................. 396/56 |
| 2006/0291842 A1 * | 12/2006 | Tokiwa et al. ............ 396/56 |

FOREIGN PATENT DOCUMENTS

JP 2002-148709 * 5/2002

* cited by examiner

*Primary Examiner*—Melissa J Koval
*Assistant Examiner*—Michael A Strieb
(74) *Attorney, Agent, or Firm*—Withrow & Terranova, PLLC

(57) ABSTRACT

A camera includes an image transducer mounted within a housing and configured to convert an image focused on the image transducer into a digital image signal, and a control unit coupled to the image transducer and configured to receive the digital image signal and to store the digital image signal in a storage device coupled to the control unit. An RF transceiver is coupled to the control unit and is configured to broadcast an RFID query signal in response to a command from the control unit, and an RFID tag is mounted on the camera and is configured to respond to the query signal with a response signal. Methods, systems and computer program products for automatic identification of device accessories are also disclosed.

27 Claims, 5 Drawing Sheets

METHODS AND SYSTEMS FOR AUTOMATIC IDENTIFICATION OF DEVICE ACCESSORIES, AND DEVICES CONFIGURED TO AUTOMATICALLY IDENTIFY ATTACHED ACCESSORIES

FIELD OF THE INVENTION

The present invention relates to the field of electronic devices and accessories for electronic devices, and in particular relates to the automatic identification of camera accessories, including methods and systems for automatic identification of camera accessories, and cameras configured to automatically identify attached accessories.

BACKGROUND

Digital cameras capture still and/or moving images and store the captured images in a memory. Typically, the memory includes a semiconductor memory, such as a nonvolatile RAM (NVRAM) memory. A captured image is converted into digital image data, which defines the color and intensity of each pixel of an image. The image data may be stored in an NVRAM memory on a removable memory card, such as a compact flash card, Memory Stick®, or the like. In some cases, a digital camera may store still and/or moving images on a CD-ROM and/or a DVD-ROM disk.

Along with the digital image, the camera may also store certain information regarding the image and/or the conditions under which the image was captured. Information that may be stored may include the date and/or time the image was recorded, the type of lens on the camera, the lens focal length setting, the exposure setting, the aperture setting, etc. Such information may be helpful, for example to the photographer, when later processing the image and/or for planning future images.

The information may be stored, for example, as "image metadata." In this context, "image metadata" refers to information that is not image data but that relates to an image and may be stored in the same electronic file as the image. It will be appreciated that metadata may be stored in the same electronic file as image data and/or may be stored separately from the image data.

However, the information described above that is typically stored as image metadata may relate only to "internal" settings, i.e. settings of the camera itself that are known to the camera because they are controlled by its electronic control system.

SUMMARY

Some embodiments of the invention provide a camera including an image transducer mounted within a housing and configured to convert an image focused on the image transducer into a digital image signal, and a control unit coupled to the image transducer and configured to receive the digital image signal and to store the digital image signal in a storage device coupled to the control unit. A wireless transceiver is coupled to the control unit and is configured to broadcast a query signal in response to a command from the control unit and to receive a response signal in response to the query signal. The wireless transceiver may include a radio frequency (RF) transceiver. An RF identification (RFID) tag is mounted on the camera and is configured to respond to the query signal with a response signal. The control unit may be configured to adjust at least one setting of the camera in response to the identifier.

The camera may further include at least one camera accessory mounted on the camera. The RFID tag may be attached to the at least one camera accessory, and the response signal may include an identifier that identifies the at least one camera accessory. The RFID tag may be configured to respond to a first RFID query signal having a first frequency and a second RFID query signal having a second frequency.

The camera may further include an accessory data table stored in an internal memory coupled to the control unit. The accessory data table may include one or more entries correlating accessory identifiers with associated accessory data.

The RF transceiver may be further configured to receive the response signal and to forward the identifier included in the response signal to the control unit, and the control unit may be further configured to receive the identifier, to read the accessory data corresponding to the identifier, and to store the accessory data along with the digital image signal.

The control unit may be configured to store the accessory data as image metadata in an electronic file along with the digital image signal.

The camera may further include an actuator coupled to the control unit and configured to provide an image capture signal to the control unit. The control unit may be configured, in response to the image capture signal, to issue the command to the RF transceiver and to cause the image transducer to capture an image.

An electronic device according to some embodiments of the invention includes a housing, a control unit within the housing, a wireless transceiver coupled to the control unit and configured to broadcast an RFID query signal in response to a command from the control unit and to receive a response signal in response to the query signal. The wireless transceiver may include a radio frequency (RF) transceiver. At least one accessory for the electronic device may be mounted to the electronic device, and an RFID tag may be mounted on the at least one accessory and configured to respond to the query signal with a response signal.

According to some embodiments of the invention, a system configured to automatically capture and record data relating to camera accessories includes a camera and an accessory. The camera includes an image transducer configured to convert an image focused on the image transducer into a digital image signal, a control unit coupled to the image transducer and configured to receive the digital image signal and to store the digital image signal in a storage device coupled to the control unit, and a first RF transceiver coupled to the control unit and configured to broadcast a first RFID query signal in response to a command from the control unit. The accessory includes an RFID tag mounted on the accessory and configured to respond to the query signal with a response signal.

The system may further include a computer including a second RF transceiver configured to broadcast a second RFID query signal and to receive an RFID response signal.

The first RF transceiver may be further configured to receive the response signal and to forward the identifier included in the response signal to the control unit, and the control unit may be further configured to receive the identifier, to read the accessory data corresponding to the identifier, and to store the accessory data along with the digital image signal.

The system may further include an external accessory, such as a light meter, and the control unit may be further configured to send the identifier or accessory data corresponding to the identifier to the external accessory.

Some embodiments of the invention provide a method of automatically identifying an accessory for an electronic device having an RF transceiver, and the accessory having an RFID tag associated therewith, the method including transmitting the RFID query signal from an RF transceiver to the accessory, receiving an RFID response signal from the RFID tag including an identifier that uniquely identifies the RFID tag, and storing the identifier in a memory, and associating the identifier with data corresponding to the accessory. A setting of the electronic device may be adjusted in response to the RFID response.

The method may further include capturing an image and storing the data corresponding to the accessory as metadata along with the image in an electronic image file.

The method may further include transmitting the identifier or the data corresponding to the accessory to an external accessory, and adjusting at least one setting of the external accessory based on the identifier or the data corresponding to the accessory.

A computer program product is provided for automatically identifying an accessory for an electronic device having an RF transceiver. The accessory may have an RFID tag associated therewith, and the computer program product may include a computer readable storage medium having computer readable program code embodied in the medium. The computer readable program code includes computer readable program code configured to transmit the RFID query signal from an RF transceiver to the accessory, computer readable program code configured to receive an RFID response signal from the RFID tag including an identifier that uniquely identifies the RFID tag, and computer readable program code configured to adjust at least one setting of the electronic device in response to the RFID response.

The computer program product may further include computer readable program code configured to store the identifier in a memory, and computer readable program code configured to associate the identifier with data corresponding to the accessory.

The computer program product may further include computer readable program code configured to capture an image, and computer readable program code configured to store the data corresponding to the accessory as metadata along with the image in an electronic image file.

The computer program product of may further include computer readable program code configured to transmit the identifier or the data corresponding to the accessory to an external accessory, and computer readable program code configured to adjust at least one setting of the external accessory based on the identifier or the data corresponding to the accessory.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Some embodiments of the invention may be used in conjunction with a camera, such as a digital camera, to which one or more accessories may be connected. Certain information regarding the state of a camera at the time of image capture may not be known to the camera's electronic control system, but may be useful to know about the image. For example, for subsequent processing and/or planning purposes, it may be useful to know what type of filter was used when capturing an image, whether or not a tripod was used, what kind of polarizer was used, what type of lens was used, whether a lens hood was used, what type of flash unit was used, etc.

In particular, many such accessories are typically connected to the camera only mechanically, if at all, and are not connected to the electronic control system of the camera in a way that would permit the electronic control system of the camera to be aware of the presence of the accessory. Thus, information concerning the presence of the accessory may not be stored in the image metadata.

Moreover, many of such accessories may be frequently removed and/or reconfigured during a single photo shoot. For example, during a single event, a photographer may change lenses, filters, and/or other accessories many times. While a photographer could theoretically manually record the state of the camera and keep a list of the accessories connected to the camera for each image taken, it may be impractical and/or unduly time consuming to do so. Moreover, since the electronic control system of a camera may be unaware of what accessories, such as filters, lenses, lens hoods, etc., are attached to the camera, the electronic control system may be unable to automatically adjust other camera settings to take better advantage of such accessories.

Figure 1:
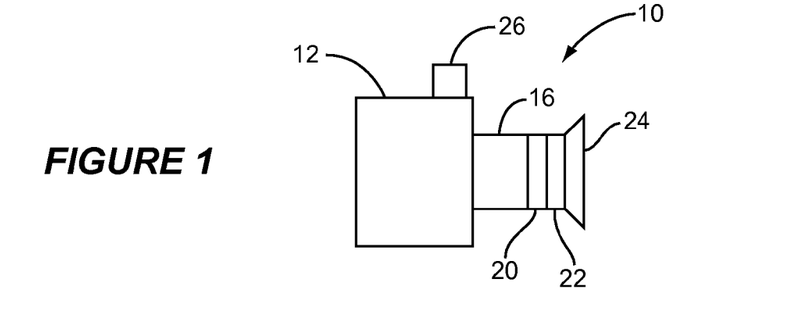
FIG. 1 is a schematic illustration of a camera with attached accessories according to some embodiments of the invention.

Accordingly, a camera may be configured according to some embodiments of the invention, as illustrated in FIG. 1. As shown therein, a camera 10 includes a housing 12 to which a lens 16 may be removably attached. It will be appreciated that in some cameras, the lens 16 may be permanently attached to the housing 12. However, in more sophisticated cameras, the lens 16 is typically removably attached to the housing to permit a photographer to attach a lens that is most appropriate to the subject being photographed, the ambient conditions, the desired photographic effect, etc. For example, the lens 16 may be a standard lens, a telephoto lens, a fisheye lens and/or another type of lens. Thus, the lens 16 itself may be considered to be an accessory that may be attached to the camera. While a typical camera 10 is illustrated in FIG. 1, it will be appreciated that the camera 10 may be integrated into other types of electronic devices, and/or that other types of electronic devices may be integrated into the camera 10. For example, the camera 10 may be integrated with a cellular telephone, a personal digital assistant (PDA) or any other type of portable electronic device.

Other types of accessories are illustrated in FIG. 1. For example, the camera 10 also includes a filter 20 attached to the lens, and a polarizer 22 attached to the filter 20. While it is shown as a separate accessory from the filter 20 in FIG. 1, the polarizer 22 may be considered a special type of optical filter. Also shown in FIG. 1 are a lens hood 24 connected to the lens 16, and a flash unit 26 connected to the housing 12. Any of these accessories may be removably attachable to the camera 10.

It will be appreciated that the accessories illustrated in FIG. 1 are optional, and that a camera 10 may be provided with more or fewer accessories than the accessories shown in FIG. 1. For example, a camera 10 may include a filter 20 but not a polarizer 22 or a lens hood 24.

As noted above, it is not uncommon for a photographer to change lenses, filters, and/or other accessories numerous times during a photo shoot. Keeping track of which accessories are connected to a camera when a particular image was recorded may be difficult and/or impractical. Accordingly, some embodiments of the invention employ Radio Frequency Identification (RFID) tags to facilitate the collection and storage of information concerning accessories attached to a camera. RFID tags are miniature electronic transponders, which may be used for a number of purposes, including identification and authentication.

RFID tags include miniature antennas configured to send/receive electronic signals, typically in a radio frequency (RF) wavelength range. RFID tags may further include electronic circuitry configured to process incoming electronic signals and/or to generate electronic signals that may be transmitted using the antenna.

RFID tags may be configured to receive and respond to radio-frequency queries from a remotely-located RF transceiver through a wireless coupling. Thus, an RFID system includes both an RF transceiver configured to transmit queries using RF signals, and at least one RFID tag configured to receive the query and respond to the query using RF signals.

Figure 2:
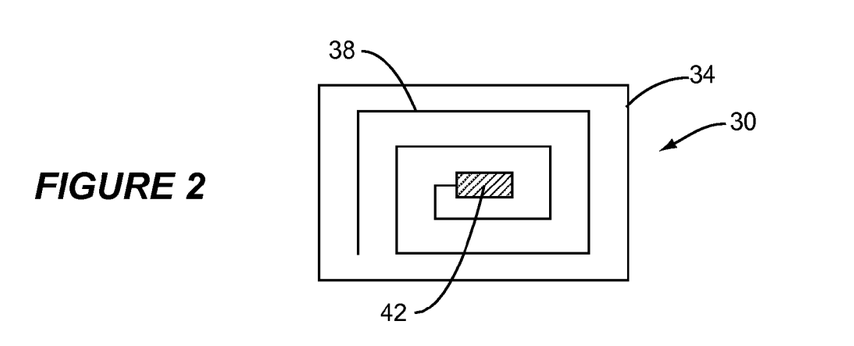
FIG. 2 is a schematic illustration of an RFID tag.

An example of an RFID tag 30 is illustrated in FIG. 2. As shown therein, an RFID tag 30 may include a substrate 34, which may be formed, for example, from a flexible dielectric material. A printed trace antenna 38 may be formed on the dielectric substrate 34. The antenna 38 may be connected to a circuit element 42. It will be appreciated that an RFID tag may be extremely small, thin and/or light. For example, some RFID tags may be less than 1 mm×1 mm in size. Thus, RFID tags may be inconspicuously applied and/or affixed to many articles without interfering with the function and/or appearance of the item. The design and fabrication of RFID tags is known in the art and need not be described in further detail herein.

RFID tags can be active, passive, or semi-passive. A passive RFID tag may have no internal power supply, and may operate using power derived from the RF signal received from the RF transceiver. The electrical current induced in the antenna of an RFID tag by the incoming RF signal from the RF transceiver may provide sufficient power for an integrated circuit (IC) in the RFID tag to transmit a response. A passive RFID tag may generate a signal by reflecting the query signal received from the RF transceiver. For example, a passive RFID tag may include a surface acoustic wave (SAW) device that responds to a signal having a particular frequency and reflects the signal in a way that uniquely identifies the RFID tag, e.g. by transmitting an ID number. However, some passive RFID tags may also include electronic circuitry that does more than simply transmit an ID number. For example, a passive RFID tag may include low power CMOS circuitry for processing incoming signals and generating appropriate responses based on the incoming signal.

Semi-passive RFID tags are very similar to passive RFID tags, except that semi-passive RFID tags may include a small battery that allows the RFID tag IC to be internally powered. Thus, a semi-passive RFID tag does not have to be designed to collect power from an incoming query signal. The antenna of a passive RFID tag can therefore be designed primarily to transmit the response signal, which may permit the RFID tag to transmit a more powerful response signal that can be received over a larger area.

Like semi-passive RFID tags, active RFID tags include an internal power source. However, while semi-passive RFID tags may be constantly "on" and listening for a query signal, active RFID tags may act as beacons that periodically transmit an outgoing signal even before a query signal is received. Active RFID tags are typically larger in size than passive and/or semi-passive RFID tags. Active RFID tags may have useful ranges of up to tens of meters, and a battery life of up to 10 years.

Accordingly, an RFID tag 30 may be attached to one or more accessories for a camera 10. Due to their small size, RFID tags 30 may be attached in a manner such that the tags 30 may be inconspicuous on the accessory and/or may not interfere with the normal functionality of the accessory. The RFID tags 30 on the accessories may be queried by a camera 10 to determine what accessories are attached to the camera. The query may be performed before, after and/or at the time an image is captured by the camera 10. The RFID tags 30 may be queried automatically when an image is captured and/or may be queried in response to a user command (such as a menu selection, button press, etc.). The RFID tags 30 connected to the accessories may include passive, semi-passive and/or active RFID tags.

Figure 3:
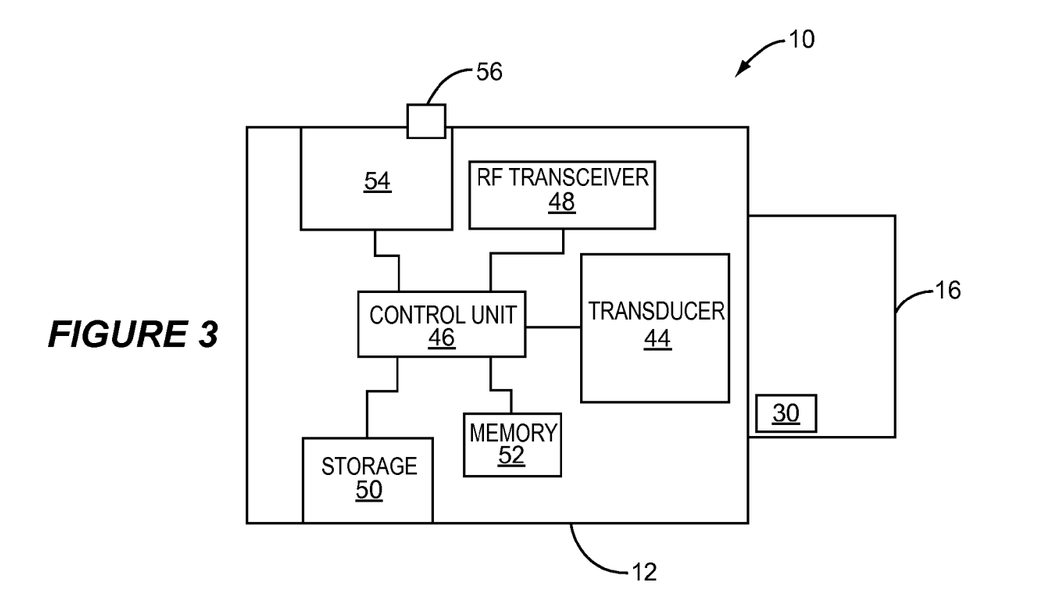
FIG. 3 is a schematic diagram illustrating certain functional elements of the electronic system of a camera configured according to some embodiments of the invention.

Functional elements of a camera 10 configured to broadcast RFID query signals to attached accessories according to some embodiments of the invention are illustrated schematically in FIG. 3. As shown therein, a camera 10 includes a housing 12 and a lens 16 attached thereto. The lens 16 is configured to focus an image onto an image transducer 44, which may include, for example, a charge coupled device (CCD) array that is configured to convert an image formed thereon into a digital image signal. The image transducer 44 is coupled to a control unit 46, which controls the operation of the image transducer 44. In particular, the image transducer 44 may capture an image focused thereon upon a command by the control unit 46. The image transducer 44 may thereafter provide a digital image signal corresponding to the captured image to the control unit 46.

The control unit 46 may store the digital image signal in an internal storage 52, which may include, for example, a non-volatile RAM (NVRAM) memory storage. Alternatively or additionally, the control unit 46 may store the digital image signal in a removable storage 50, which may include a flash memory card including an NVRAM memory, a recordable CD-ROM and/or DVD-ROM, etc.

The camera 10 may further include an RF transceiver 48 coupled to the control unit 46 and configured, upon receipt of a command from the control unit 46, to broadcast an RFID query signal to accessories located within range of the transceiver 48. The RF transceiver 48 may be further configured to receive an RFID response signal in response to the transmitted RFID query signal, and to provide the RFID response signal, or information included in the RFID response signal, to the control unit 46.

The camera 10 may further include a user interface 54 that is configured to permit a user to interact with the camera 10. The user interface 54 may include one or more user input devices, such as buttons, a jog dial, a touch screen, a liquid crystal display, etc.

The user interface 54 may include an actuator 56 coupled to the control unit and configured to provide one or more signals to the control unit 46 configured to instruct the control unit 46 to identify attached accessories and/or to capture an image. For example, the actuator 56 may include a button switch having first, second and third positions. In a first position, the actuator 56 may be unpressed, i.e. unactivated. When the actuator 56 is moved to a second switch position (e.g. when the button is depressed halfway), a first signal may be sent to the control unit 46 that causes the control unit 46 to identify any attached accessories using an RFID query/response. When the actuator 56 is moved to the third position (e.g. when the button is fully depressed), a second signal may be sent to the control unit 46 that causes the control unit 46 to capture an image. In some embodiments, the actuator 56 may be moved to the third position only after it has been moved to the second position. Thus, in some embodiments, the control unit 46 may identify the attached accessories whenever an image is captured.

In order for the camera 10 to identify the accessories that are attached to the camera when an image is captured, the an RFID tag 30 may be attached to one or more accessories. As a typical accessory does not already include an integrated RFID tag, some embodiments of the invention provide a set of generic RFID tags 30, each of which may be attached to a particular accessory. An RFID tag 30 may be attached to an accessory by any of a number of means, such as by means of tape, glue, epoxy resin, etc. In some cases, RFID tags may be provided that are pre-mounted on a substrate with a tape backing, such that the RFID tag may be affixed to an accessory by peeling a cover sheet from the tape and sticking the substrate onto the accessory.

Figure 4A:
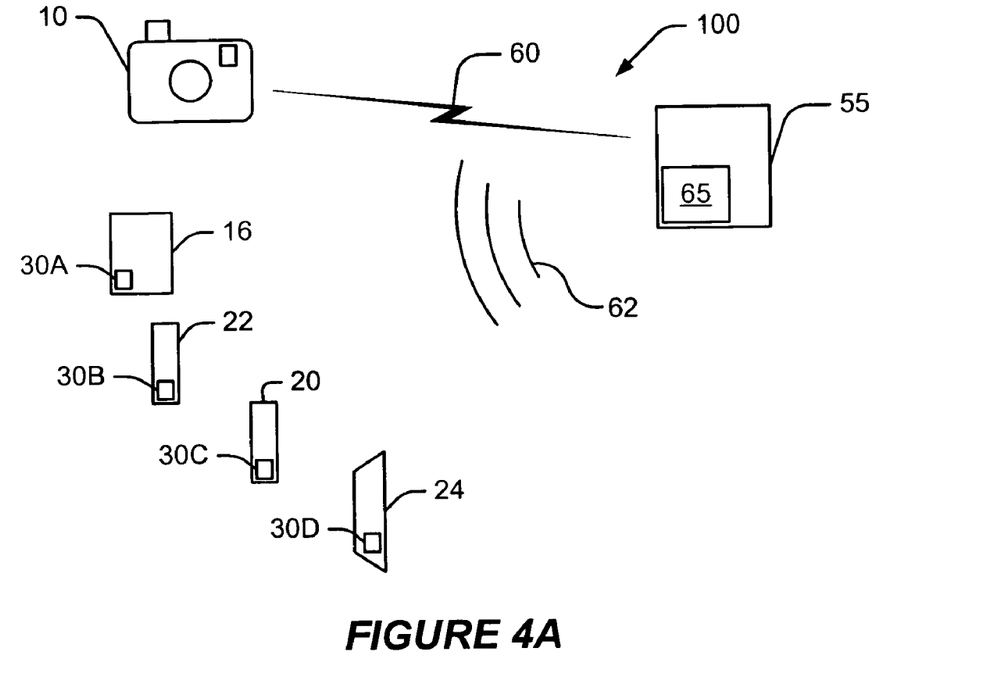
FIGS. 4A and 4B are schematic illustrations of systems configured to obtain information about attached camera accessories according to some embodiments of the invention.

The RFID tags 30 may be associated with particular accessories, for example, by using a system 100 as illustrated in FIG. 4A. As shown therein, a user may desire to associate a plurality of RFID tags 30A-30D with a plurality of respective accessories, such as a lens 16, a filter 20, a polarizer 22, a lens shroud 24, etc. It will be appreciated that while four RFID-tagged accessories are shown in FIG. 4A, more or fewer that four RFID-tagged accessories may be provided.

At this stage, the accessories may be unmounted as shown, and/or may be mounted on a camera 10. A computer 55 including an RF transceiver 65 is provided. The computer 55 may be a general purpose digital computer, and may be an appropriately configured laptop computer, desktop computer, and/or handheld computer. An application program on the computer 55 is configured to control the operation of the RF transceiver 65.

Figure 5:
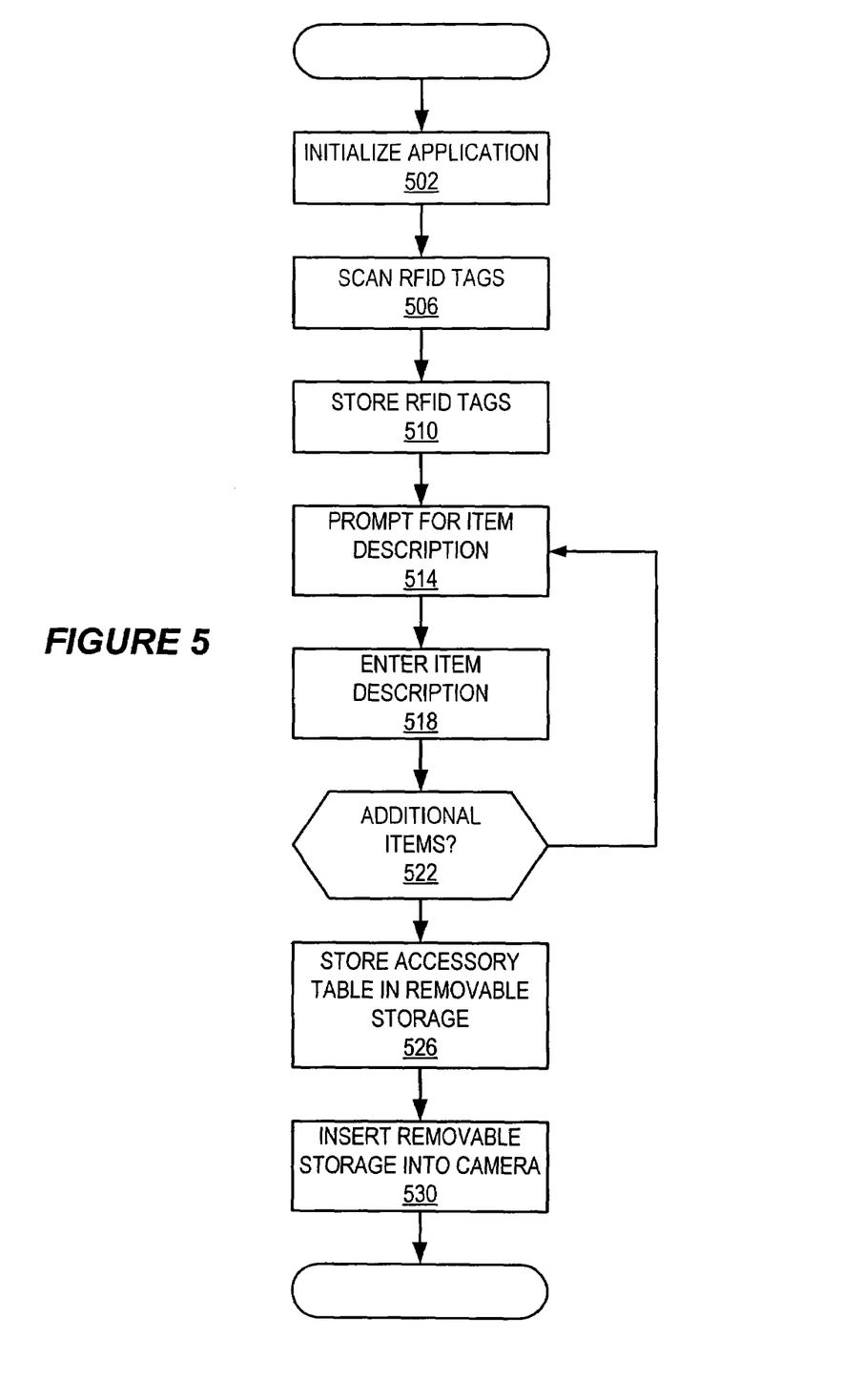
FIG. 5 is a flowchart illustrating operations according to some embodiments of the invention.

Referring to FIG. 4A and to the flowchart of FIG. 5, after the RFID application program is initialized (block 502), the application program causes the RF transceiver 65 of the computer 55 to scan the RFID tags 30A-30D that are located in the vicinity of the computer 55 (block 506).

In order to scan the RFID tags, the RFID application program causes the RF transceiver 65 in the computer to broadcast an RFID query signal 62. Each of the RFID tags 30A-30D that is in range to receive the RFID query signal 62 may respond to the query signal with an RFID response signal. The RFID response signal of each of the RFID tags 30A-30D may include an identifier, such as a number, that uniquely identifies the tag. Each of the RFID tags 30A-30D may be provided with circuitry that generates a random and/or predetermined response delay, so that the responses received from the various RFID tags may not interfere with each other.

The RF transceiver 65 in the computer 55 may receive a number of RFID responses from the accessories. The RF transceiver 65 may provide the identifiers from the received RFID response signals to the RFID application program, which may store the identifiers in a table (block 510).

The application may then display the first identifier and prompt the user for a description of the accessory to which the RFID tag corresponding to that identifier is attached (block 514). The user may then enter a description of the accessory (block 518), to thereby build an accessory data table. Other information regarding the accessory may be entered by the user and stored by the RFID application program. For example, the application program may provide fields for storing an accessory manufacturer, an accessory type, an accessory feature, etc. For example, for a filter, the application may store a feature of the filter, such as its bandwidth, cutoff frequencies, etc., that may, for example, be useful in determining an appropriate exposure to use when that filter is on the camera 10.

After data regarding the first accessory has been entered, the application may determine if additional identifiers are left (block 522). If so, the application may prompt the user for input regarding the next accessory (block 514). If not, the application program may store the accessory data in a removable storage, such as a flash memory or a recordable disk (block 526). The removable storage may be removed from the computer 55 and placed into the camera 10 (block 530). The camera 10 may then store the table of accessory data, for example, in the internal memory 52 (FIG. 3) of the camera 10. Alternatively, as illustrated in FIG. 4A, the accessory data may be transmitted directly to the camera 10 by means of a communication link 60. The communication link 60 may include a wired connection, such as a USB connection with the camera 10. Alternatively, the communication link 60 may include a wireless communication link, such as a BLUETOOTH® communication link, an infrared (IR) communication link, or the like.

Figure 4B:
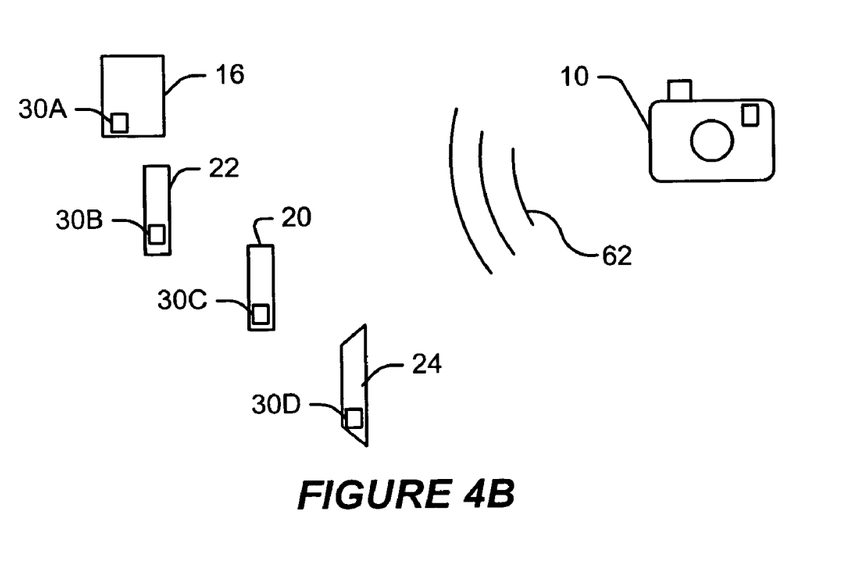

Instead of using a computer 55 as provided above, the accessory information may be captured directly by the camera 10 as shown in FIG. 4B. As shown in FIG. 4B, the camera 10 may broadcast the RFID query signal 62 to the accessories, and receive RFID response signals back from the RFID tags 30A-30D. The camera 10 may be provided with a user interface 54 that permits entry of information concerning the accessories into an accessory table which may be stored directly in the internal memory 52 of the camera 10. If the user interface 54 is limited (e.g. if the user interface 54 does not include a full keyboard), the accessory information may be entered by the camera 10 using, for example, selections from drop-down lists presented to the user on a display screen of the camera 10. As in the system of FIG. 4A, the accessories may or may not be connected to the camera 10 when they are inventoried.

Figure 6:
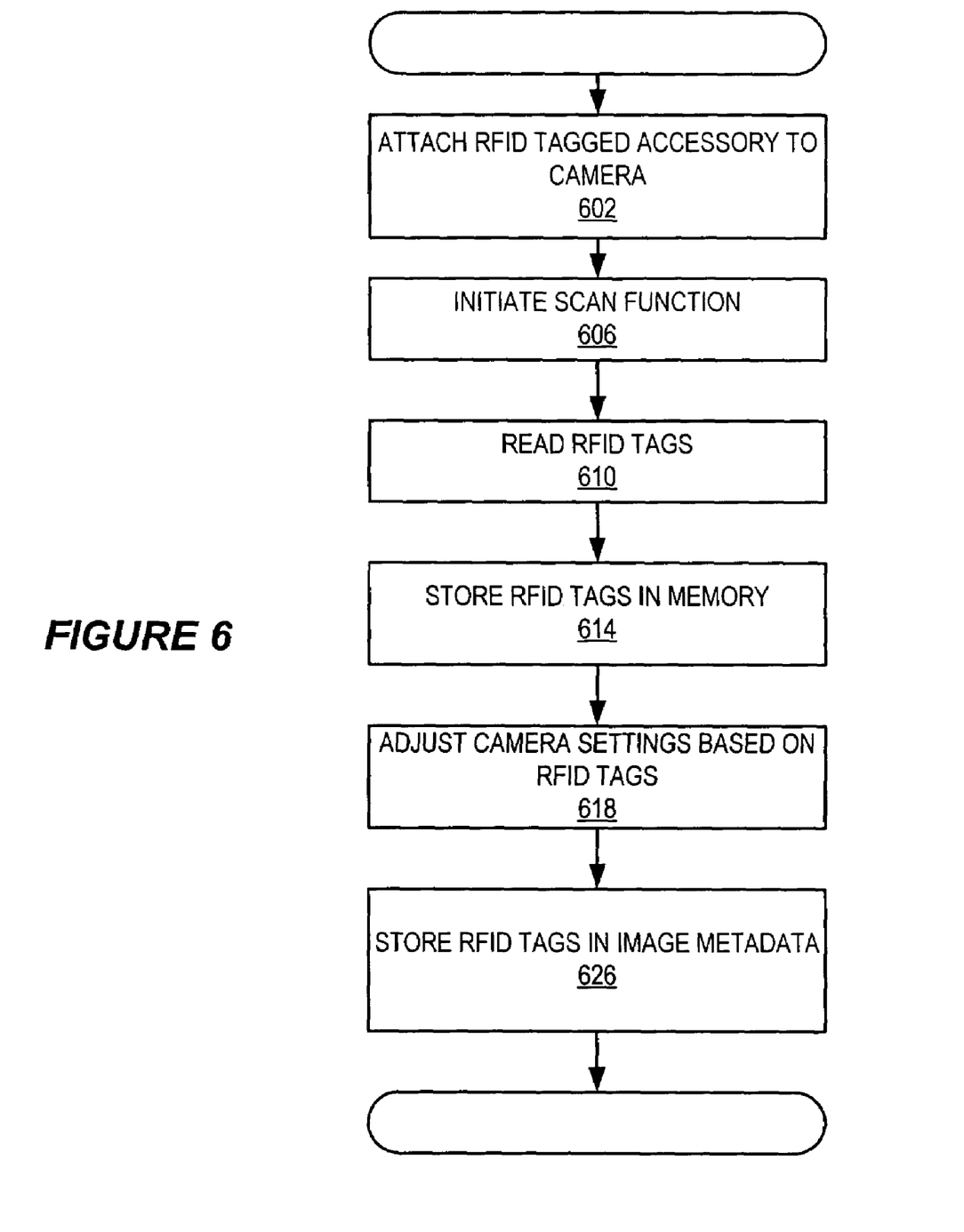
FIG. 6 is a flowchart illustrating operations according to some embodiments of the invention.

Referring now to FIG. 6, operations of a camera 10 according to some embodiments of the invention are described in conjunction with FIG. 3. One or more RFID-tagged accessories are attached to a camera 10 (block 602). Upon a command from the user, such as by operation of the actuator 16, the control unit 46 of the camera 10 causes the RF transceiver 48 to initiate a scan of accessories attached to the camera (block 606). In response to the command from the control unit 46, the RF transceiver 48 broadcasts an RFID query signal, which may be received by RFID tags 30 in range of the signal. Those RFID tags 30 that receive the RFID query signal from the RF transceiver 48 may respond with an RFID response signal. The RFID response signals may be received by the RF transceiver 48, and the identifiers in the RFID response signals may be provided to the control unit 46 (block 610). The identifiers may be stored in memory by the control unit 46 (block 614).

Once the camera 10 has received the identifiers of the various accessories attached to the camera 10, the camera 10 may use the stored accessory table to determine which accessories are in use. Based on this information, the camera 10 may adjust one or more settings of the camera to better take advantage of the accessories in use (block 618). Settings of the camera such as aperture, shutter speed, focus, and the like may be adjusted according to the presence and/or absence of various accessories.

Figure 7:
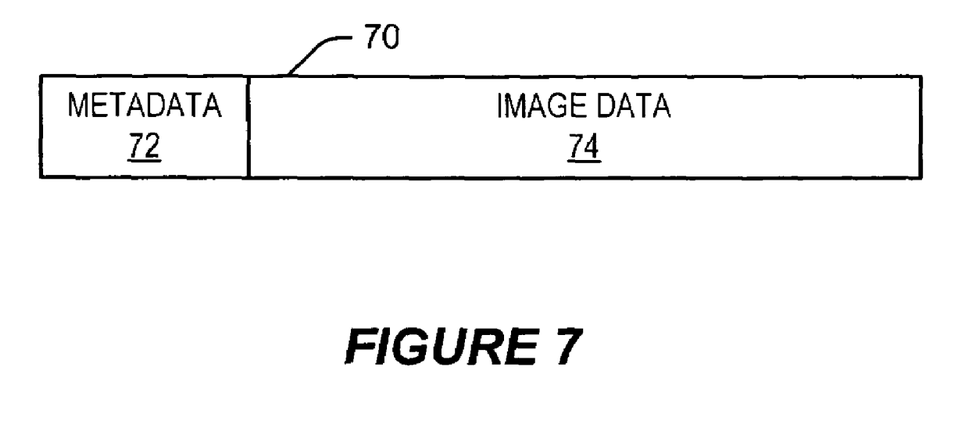
FIG. 7 is a schematic diagram of an image file including image data and image metadata according to some embodiments of the invention.

When an image is captured by the camera 10, the camera 10 may then store the image. The camera may store the accessory data relating to the accessories in use at the time the image was captured, either separately from the digital image data file or together with the digital image data file as metadata (block 626). For example, as illustrated in FIG. 7, an image data file 70 may include a header 72 including metadata (i.e. data about the image) along with the image data 74. The metadata may include information concerning the conditions under which the image was captured. For example, the metadata in the header 72 may include the date and/or time the image was captured, the aperture setting, shutter speed, and other information concerning camera settings at the time the image was captured. In addition, according to some embodiments of the invention, the metadata may include information about the accessories on the camera at the time the image was captured that may be taken from the accessory data table based on responses to the RFID query signal.

Figure 8:
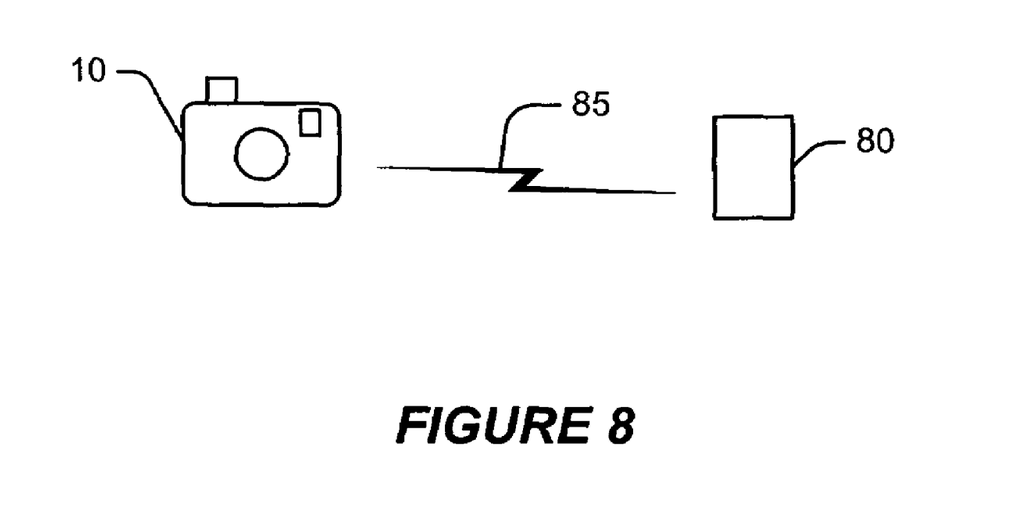
FIG. 8 is a schematic diagram illustrating communication between a camera and a separate accessory according to some embodiments of the invention.

In addition to storing accessory data as meta data in an image file, accessory data may be provided by the camera to one or more external accessories that may make use of the accessory data. For example, as illustrated in FIG. 8, the accessory data and/or RFID identifiers for attached accessories may be provided to an external accessory such as a light meter 80 over a communication link 85. The communication link 85 may include a wired connection, such as a USB connection with the camera 10. Alternatively, the communication link 85 may include a wireless communication link, such as a BLUETOOTH® communication link, an infrared (IR) communication link, or the like.

The light meter 80 may include a table listing the RFID identifiers for each of the accessories, which may affect the operation of the light meter 80. In particular, the light meter 80 may have a table with an entry for each filter 20 attached to the camera 10. The table may further include information regarding the number of additional exposure stops that may be desirable for an optimal exposure for each filter that may be used on the camera 10. When the light meter 80 is used to detect the optimal exposure, the shutter speed reported to the user may take into account the exposure values for each filter reported as attached to the camera 10.

It will be appreciated that when the RF transceiver 48 of the camera 10 broadcasts an RFID query signal, it is possible that some accessories that are not attached to the camera 10 may nevertheless be close enough to the camera such that they may unintentionally receive the RFID query signal. It is known that the range of an RFID system, and in particular a system employing passive RFID tags, depends on the frequency used for the RFID signal. Accordingly, one or more of the RFID tags 30 may include circuitry that is responsive to a signal having a first frequency that is used for querying RFID tags within a first range, and circuitry that is responsive to a signal having a second frequency that is used for querying RFID tags within a second range, smaller than the first range. Thus, when the RFID tags are being inventoried (as in the operations of FIG. 5), a first signal having a larger range may be used. When the RFID tags are being queried to see if they are currently in use on the camera 10 (as in the operations of FIG. 6), a second signal having a shorter range may be used. The RFID tags 30 may be configured to respond to both signals.

While embodiments of the invention are illustrated in the context of identifying accessories for a camera, it will be appreciated that the invention is not limited in application to cameras and camera accessories, but may be advantageously employed in connection with any electronic device to which one or more accessories may be attached. For example, some embodiments of the invention may provide an electronic device having a control unit and an RF transceiver coupled to the control unit and configured to broadcast an RFID query signal in response to a command from the control unit. The electronic device may have an accessory mounted in or on the electronic device. An RFID tag configured to respond to the query signal with a response signal may be mounted on the accessory. The electronic device may further include an accessory data table stored in an internal memory coupled to the control unit. The accessory data table may include one or more entries correlating accessory identifiers with associated accessory data. The RF transceiver receives the response signal and forwards the identifier included in the response signal to the control unit, which may read the accessory data corresponding to the identifier.

Such a system may be used, for example, for diagnostic purposes to permit a user of an electronic device to cause the electronic device to query accessories connected to the device to verify the presence of one or more of the accessories. For example, where the electronic device comprises a housing and an accessory included within the housing, it may be inconvenient to open the housing to verify the presence of the accessory if, for example, the accessory fails to operate or otherwise fails to respond directly to the control unit. By using embodiments of the present invention, the presence of the accessory may be verified by the receipt of a response signal from an RFID tag attached to the accessory in response to an RFID query signal transmitted by an RF transceiver included within the electronic device.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A camera, comprising:
   an image transducer mounted within a housing and configured to convert an image focused on the image transducer into a digital image signal;
   a control unit coupled to the image transducer and configured to receive the digital image signal and to store the digital image signal in a storage device coupled to the control unit;
   an RF transceiver coupled to the control unit and configured to broadcast a query signal in response to a command from the control unit and to receive a response signal in response to the query signal; and
   at least one accessory coupled with the camera, where an RFID tag configured to generate the response signal in response to the query signal is coupled with the at least one accessory.

2. The camera of claim 1, wherein the response signal comprises an identifier that identifies the at least one accessory.

3. The camera of claim 2, wherein the control unit is configured to adjust at least one setting of the camera in response to the identifier.

4. The camera of claim 2, wherein the RFID tag is configured to respond to a first RFID query signal having a first frequency and a second RFID query signal having a second frequency.

5. The camera of claim 2, further comprising an accessory data table stored in an internal memory coupled to the control unit, wherein the accessory data table includes one or more entries correlating accessory identifiers with associated accessory data.

6. The camera of claim 5, wherein the RF transceiver is further configured to receive the response signal and to forward the identifier included in the response signal to the control unit, and wherein the control unit is further configured to receive the identifier, to read the associated accessory data corresponding to the identifier, and to store the associated accessory data along with the digital image signal.

7. The camera of claim 6, wherein the control unit is configured to store the associated accessory data as image metadata in an electronic file along with the digital image signal.

8. The camera of claim 1, wherein the at least one accessory comprises a lens removably attached to the housing and configured to focus the image on the image transducer.

9. The camera of claim 1, further comprising a lens removably attached to the housing and configured to focus the image on the image transducer, and wherein the at least one accessory comprises a filter or a lens shroud removably attached to the lens.

10. The camera of claim 1, further comprising an actuator coupled to the control unit and configured to provide an image capture signal to the control unit, wherein the control unit is configured, in response to the image capture signal, to issue the command to the RF transceiver and to cause the image transducer to capture the image.

11. An electronic capture device comprising:
    a housing;
    a control unit within the housing;
    a wireless transceiver coupled to the control unit and configured to broadcast a query signal in response to a command from the control unit and configured to receive a response signal in response to the query signal;

at least one accessory coupled with the electronic capture device including an RFID tag mounted on the electronic capture device, the RFID tag configured to respond to the query signal with the response signal.

12. The electronic capture device of claim 11, wherein the wireless transceiver comprises an RF transceiver, and wherein the query signal comprises an RFID query signal.

13. The electronic capture device of claim 12, further comprising an accessory data table stored in an internal memory coupled to the control unit, wherein the accessory data table includes one or more entries correlating accessory identifiers with associated accessory data.

14. The electronic capture device of claim 13 wherein the RF transceiver is further configured to receive the response signal and to forward an identifier of the accessory identifiers included in the response signal to the control unit, and wherein the control unit is further configured to receive the identifier, to read the associated accessory data corresponding to the identifier, and to store the associated accessory data in an electronic file.

15. A system for automatically capturing and recording data relating to camera accessories, comprising:

a camera comprising an image transducer configured to convert an image focused on the image transducer into a digital image signal, a control unit coupled to the image transducer and configured to receive the digital image signal and to store the digital image signal in a storage device coupled to the control unit, and a first RF transceiver coupled to the control unit and configured to broadcast a first RFID query signal in response to a command from the control unit; and an accessory comprising an RFID tag mounted on the camera and configured to respond to the first RFID query signal with a response signal.

16. The system of claim 15, further comprising:

a computer comprising a second RF transceiver configured to broadcast a second RFID query signal and to receive an RFID response signal.

17. The system of claim 16, wherein the first RFID query signal is in a first frequency range and the second RFID query signal is in a second frequency range different from the first frequency range, and wherein the RFID tag is configured to respond to both the first RFID query signal and the second RFID query signal.

18. The system of claim 17, wherein the response signal comprises an identifier that identifies the accessory, and wherein the control unit is configured to adjust at least one setting of the camera in response to the identifier.

19. The system of claim 18, further comprising an accessory data table stored in an internal memory coupled to the control unit, wherein the accessory data table includes one or more entries correlating accessory identifiers with associated accessory data.

20. The system of claim 19, wherein the first RF transceiver is further configured to receive the response signal and to forward the identifier included in the response signal to the control unit, and wherein the control unit is further configured to receive the identifier, to read the associated accessory data corresponding to the identifier, and to store the associated accessory data along with the digital image signal.

21. The system of claim 20, further comprising an external accessory, wherein the control unit is further configured to send the identifier or associated accessory data corresponding to the identifier to the external accessory.

22. A method of automatically identifying an accessory for an electronic device, the electronic device having an RF transceiver, and the accessory having an RFID tag associated with the accessory, the method comprising:

transmitting an RFID query signal from the RF transceiver to the accessory;

receiving an RFID response signal from the RFID tag including an identifier that uniquely identifies the RFID tag;

storing the identifier in a memory;

associating the identifier with data corresponding to the accessory;

transmitting the identifier or data corresponding to the accessory to an external accessory; and adjusting at least one setting of the external accessory based on the identifier or the data corresponding to the accessory.

23. The method of claim 22, further comprising:

adjusting at least one setting of the electronic device in response to the RFID response signal.

24. The method of claim 23, wherein the electronic device comprises a camera, the method further comprising:

capturing an image; and storing the data corresponding to the accessory as metadata along with the image in an electronic image file.

25. A computer program product for automatically identifying an accessory for an electronic device, the electronic device having an RFID transceiver, and the accessory having an RFID tag associated with the accessory, the computer program product comprising:

a computer readable storage medium having computer readable program code embodied in the computer readable storage medium, the computer readable program code comprising:

computer readable program code configured to transmit an RFID query signal from the RFID transceiver to the accessory;

computer readable program code configured to receive an REID response signal from the RFID tag containing an identifier that uniquely identifies the RFID tag;

computer readable program code configured to adjust at least one setting of the electronic device in response to the RFID response signal;

computer readable program code configured to transmit the identifier or data corresponding to the accessory to an external accessory; and computer readable program code configured to adjust at least one setting of the external accessory based on the identifier or the data corresponding to the accessory.

26. The computer program product of claim 25, further comprising:

computer readable program code configured to store the identifier in a memory; and computer readable program code configured to associate the identifier with the data corresponding to the accessory.

27. The computer program product of claim 26, wherein the electronic device comprises a camera, further comprising:

computer readable program code configured to capture an image; and computer readable program code configured to store the data corresponding to the accessory as metadata along with the image in an electronic image file.

* * * * *

UNITED STATES PATENT AND TRADEMARK OFFICE
CERTIFICATE OF CORRECTION

PATENT NO.         : 7,561,786 B1                               Page 1 of 1
APPLICATION NO. : 11/298739
DATED              : July 14, 2009
INVENTOR(S)        : Gary W. Black It is certified that error appears in the above-identified patent and that said Letters Patent is hereby corrected as shown below:

Claim 25, Column 14
Line 39, change
"REID"
to
--RFID--

Signed and Sealed this

First Day of September, 2009

David J. Kappos
*Director of the United States Patent and Trademark Office*